June 21, 1927.
A. H. JOHNSON
1,633,332
DIRIGIBLE HEADLIGHT FOR AUTOMOBILES
Filed May 19, 1926
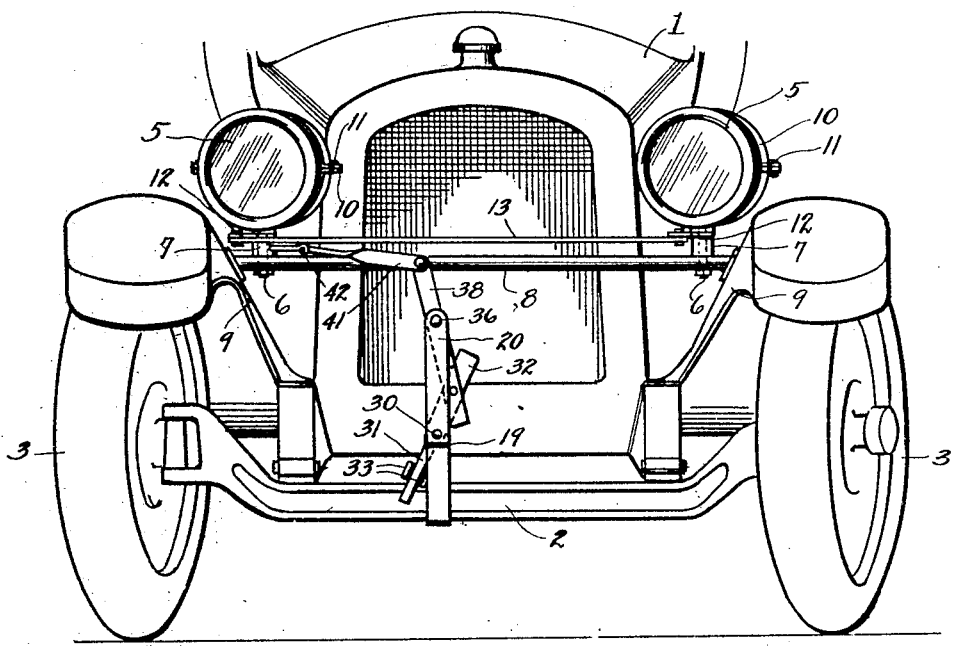
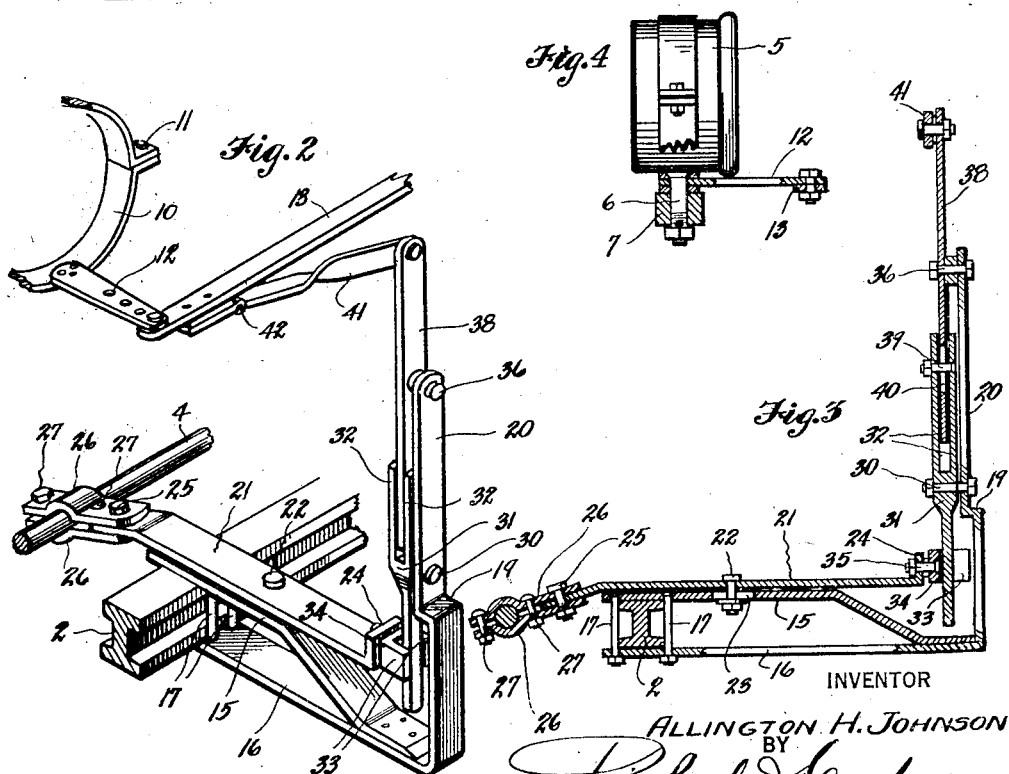
INVENTOR
ALLINGTON H. JOHNSON
BY
Richard J. Cook
ATTORNEY Patented June 21, 1927.

1,633,332

UNITED STATES PATENT OFFICE.

ALLINGTON H. JOHNSON, OF TACOMA, WASHINGTON.

DIRIGIBLE HEADLIGHT FOR AUTOMOBILES.

Application filed May 19, 1926. Serial No. 110,115.

This invention relates to improvements in dirigible headlights for automobiles and other types of motor driven vehicles; more particularly, the invention relates to mechanism to be used in operative connection with the steering mechanism of an automobile whereby the head lights may be automatically turned from side to side, in accordance with change in direction of travel of the vehicle, in order that the light therefrom will at all times be cast in the roadway to add to the safety and convenience of driving especially in winding roadways and in making sharp turns.

The principal object of this invention is to provide mechanism that may be made at a relatively small cost, that is easily installed or attached and which will operate automatically to change the direction of the lights in accordance with each change of direction of the steering wheels.

Another object is to provide mechanism of the above character that may be installed without necessitating any change, alteration or addition of parts on the car as they already exist and which is to be used in connection with the headlight with which the vehicle is originally equipped.

In accomplishing these and other objects of the invention, I have provided the improved details of construction, the preferred forms of which are illustrated in the accompanying drawings wherein—

Figure 1 is a front view of an automobile equipped with dirigible headlights in accordance with the present invention.

Figure 2 is a perspective view of the headlight turning mechanism.

Figure 3 is a sectional detail of the mechanism showing the pivoted connections of the various levers and the manner of attaching the supporting bracket to the vehicle axle.

Figure 4 is a view showing the pivotal mounting of one of the headlights and its turning lever.

Referring more in detail to the several views of the drawings—

1 designates what may be an automobile of any of the common types or makes, having a front axle 2, by means of which the front, steering wheels 3—3 are mounted, and 4 designates the steering arm connecting rod by means of which the wheels are held in alinement with respect to each other and which, in connection with other steering gear, not shown, is used to steer the car along a roadway.

In the present illustration, the vehicle is equipped with headlights 5—5, each pivotally supported by means of a vertical pivot pin 6 that is fixed to the lower side of the headlight housing and extends downwardly and revolubly through a bearing 7 which may be of any suitable character, as in a cross rod 8, extended between the fenders 9. Detachably fixed about each of the headlight housings is a band 10 formed of two semi-circular sections with ends bolted together as at 11, and fixed to the lower portions of these bands are forwardly extending arms or levers 12 by means of which the headlights may be rotated from side to side and which are connected at their outer ends by means of a cross bar 13 so that both headlights may be operated together and held in parallel relation during operation.

The headlight actuating mechanism is supported by means of a bracket that is fixed rigidly to and which extends forwardly from the axle 2. As shown best in Figures 2 and 3, the bracket comprises upper and lower horizontally disposed bars 15 and 16, the rearward ends of which are disposed against upper and lower faces, respectively, of the axle and are clamped rigidly thereto by means of bolts 17 extended therethrough on opposite sides of the axle. The bar 15, near its outer end, is inclined downwardly to the bar 16 and is riveted or otherwise connected therewith. The bar 16 extends forwardly of the axle a sufficient distance to clear the front of the vehicle and is then turned vertically upward for a short distance and is then offset inwardly a slight distance, as at 19, and then continues vertically upward providing the arm 20 to which parts are attached as presently described.

Mounted horizontally upon the bracket bar 15 is a bar 21 which is pivotally attached to the bracket by means of a bolt 22 that is slidably mounted in a slot 23 formed longitudinally in the bar 15. At its forward end the bar 21 has a vertically upturned foot 24 and at its rearward end is pivotally fixed by means of a bolt 25 between a pair of clamping plates 26—26 that fit against opposite sides of the steering cross rod 4 and are clamped securely thereto by bolts 27 through their ends.

Pivotally attached by means of a bolt 30, that extends through the vertical arm 20 of the bracket at a point just above the offset 19, is a lever 31, the upper end of which is bifurcated to provide the two spaced apart, parallel arms 32—32, and which, at its lower end, is slidably contained between the spaced guide wings 33—33' of a block 34 that is pivotally mounted at the forward end of lever by means of a bolt 35.

Pivotally mounted by means of a bolt 36 that extends through the upper end of the bracket standard 20 is a lever 38 having its lower end slidably disposed between the spaced arms 32—32 of lever 31 and pivotally connected thereto by means of a bolt 39 that is fixed in said arms and which extends through a slot 40 provided longitudinally of the lever 38. Pivotally connected with the upper end of the lever 38 is a link 41 which extends laterally and at its end is hingedly connected, as at 42, with the cross bar 13 whereby the headlight turning arms are connected.

Assuming that the parts are so constructed and assembled and that the several fulcrums or pivot points have been properly located, it is readily apparent that should the steering mechanism of the vehicle be actuated to turn the steering wheels so as to direct the vehicle about a curve or turn in a roadway the various levers will be actuated to turn the headlights accordingly so that the light is always directed in the direction of travel.

It is further apparent that the slot connections in the various parts provides for the required relative movements of the levers, and it is further to be understood that the lengths of the levers and location of the pivot points will be determined by the location of parts with which the device is to be used and may vary for different makes of cars.

It is also apparent that in vehicles having headlights set forward sufficiently that the turning arms 12 may be extended rearwardly instead of forwardly as here shown, the lever 31 may be eliminated and the lower end of lever 38 extended into operative connection with guide 34 on the forward end of lever 21.

It is further apparent that various minor details of construction can be altered without departing from the spirit of the invention and, for this reason, I do not desire to be limited only to the device as herein illustrated.

Having thus described my invention, what I claim as new therein and desire to secure by Letters-Patent, is:

1. The combination with a vehicle of the character described having an axle, a steering knuckle connecting rod and pivotally supported headlights with arms attached thereto for rotating the same, of a bracket fixed rigidly to the axle having a horizontal portion extending forwardly therefrom and provided, at its outer end, with a vertical standard, a horizontal lever pivotally attached to the horizontal portion of the bracket and operatively connected at its rearward end with the said connecting rod, a guide fixed at the forward end of the said lever, a second lever pivotally mounted on the standard having its lower end disposed within the said guide and a third lever pivotally mounted on the bracket connected, at its lower end, with the upper end portion of the second lever, and a link connecting the upper end of the third lever with the headlight rotating arms.

2. The combination with a vehicle of the character described having a front axle, a steering knuckle connecting rod disposed back of the axle and having pivotally mounted headlights with arms extending forwardly therefrom whereby they may be rotated, and a cross bar connecting the said arms, of a bracket fixed rigidly to the axle comprising a horizontal portion extended forwardly from the axle and a vertical standard at its forward end, a horizontal lever having a pivotal and slidable connection with the horizontal portion of the bracket and having a pivotal connection, at its rearward end, with the steering knuckle connecting rod, a guide member pivotally mounted at the forward end of the lever, a second lever pivotally mounted on the vertical portion of the bracket having its lower end slidably contained in said guide member, a third lever pivotally mounted on the upper end of the standard having a pin and slot connection with the upper end of the second lever and a link pivotally connecting the upper end of the third lever with the cross bar which connects arms of the headlights.

Signed at Seattle, Washington, this 1st day of May, 1926.

ALLINGTON H. JOHNSON.